United States Patent
DiMascio

(10) Patent No.: US 10,046,990 B2
(45) Date of Patent: Aug. 14, 2018

(54) ELECTROLYTIC METHOD OF GENERATING CHLORIDE DIOXIDE WITH IMPROVED THEORETICAL YIELD

(75) Inventor: Felice DiMascio, Rocky Hill, CT (US)

(73) Assignee: Ecolab USA Inc., St. Paul, MN (US)

(*) Notice: Subject to any disclaimer, the term of this patent is extended or adjusted under 35 U.S.C. 154(b) by 1056 days.

(21) Appl. No.: 13/153,656

(22) Filed: Jun. 6, 2011

(65) Prior Publication Data

US 2012/0305494 A1 Dec. 6, 2012

(51) Int. Cl.

| | | |
|---|---|---|
| C02F 1/00 | (2006.01) |
| C02F 1/48 | (2006.01) |
| C02F 1/72 | (2006.01) |
| C02F 1/76 | (2006.01) |
| C02F 1/78 | (2006.01) |
| C02F 1/469 | (2006.01) |
| C02F 1/467 | (2006.01) |
| C25B 1/26 | (2006.01) |
| C25B 1/34 | (2006.01) |
| C25C 1/00 | (2006.01) |

(52) U.S. Cl.
CPC .......... *C02F 1/4695* (2013.01); *C02F 1/4678* (2013.01); *C25B 1/26* (2013.01); *Y02W 10/37* (2015.05)

(58) Field of Classification Search
USPC .......... 204/95, 98, 101, 129, 275.1, 278.5; 205/556, 615; 210/748.2; 422/37, 110; 423/477
See application file for complete search history.

(56) References Cited

U.S. PATENT DOCUMENTS

| | | | |
|---|---|---|---|
| 2,163,793 A | 6/1939 | Logan | |
| 2,452,970 A * | 11/1948 | Vincent et al. | 210/667 |
| 2,717,237 A | 9/1955 | Rempel | |
| 3,438,879 A * | 4/1969 | Miller et al. | 205/514 |
| 4,234,446 A * | 11/1980 | Ramras | B01J 7/02 |
| | | | 252/187.21 |
| 4,247,531 A * | 1/1981 | Hicks | C01B 11/022 |
| | | | 210/754 |

(Continued)

FOREIGN PATENT DOCUMENTS

| | | |
|---|---|---|
| GB | 714828 A | 9/1954 |
| JP | 56-158883 A | 12/1981 |

(Continued)

OTHER PUBLICATIONS

Kelly—Chlorine Disinfectants and ORP Control [Dec. 8, 2004; 7 pages].*

(Continued)

*Primary Examiner* — Hayden Brewster
(74) *Attorney, Agent, or Firm* — Merchant & Gould P.C.

(57) ABSTRACT

The invention is directed to an apparatus and methods of its use to generate chlorine dioxide. The apparatus comprises three cation exchange resin chambers in fluidic communication to convert chlorite salt into chlorine dioxide. Unlike previous converters, the invention utilizes an novel method of acidifying some of the chlorite to produce a more effective process. The invention can achieve a 100% theoretical yield which is s significant improvement over the 80% theoretical yield in previous attempts using non-acidifying chemistry. The method also avoids the need for expensive catalysts.

14 Claims, 2 Drawing Sheets

(56) References Cited

U.S. PATENT DOCUMENTS

| | | | |
|---|---|---|---|
| 4,542,008 A | | 9/1985 | Capuano et al. |
| 5,084,149 A | * | 1/1992 | Kaczur et al. ............... 205/556 |
| 5,092,970 A | * | 3/1992 | Kaczur .................... C25B 1/26 |
| | | | 204/520 |
| 5,106,465 A | | 4/1992 | Kaczur et al. |
| 5,198,080 A | * | 3/1993 | Cowley et al. ............... 205/343 |
| 6,203,688 B1 | | 3/2001 | Lipsztajn et al. |
| 6,869,517 B2 | | 3/2005 | DiMascio |
| 2004/0149571 A1 | * | 8/2004 | Tremblay et al. ......... 204/275.1 |
| 2005/0034997 A1 | * | 2/2005 | DiMascio et al. ............ 205/556 |
| 2005/0079122 A1 | * | 4/2005 | DiMascio ..................... 423/477 |
| 2005/0252786 A1 | * | 11/2005 | DiMascio ..................... 205/499 |
| 2011/0129388 A1 | * | 6/2011 | Alarid et al. ................... 422/37 |

FOREIGN PATENT DOCUMENTS

| | | | |
|---|---|---|---|
| WO | WO 91/09158 A1 | 6/1991 | |
| WO | WO 94/26670 A1 | 11/1994 | |
| WO | WO 2008024828 A1 * | 2/2008 | ............. C01B 11/02 |

OTHER PUBLICATIONS

Sodium Chlorite MSDS [9 pages].*
ScienceLab.com (Sodium Hypochlorite MSDS (May 21, 2013)).*
Vogler (Biological Properties of Water, Water in Biomaterials Surface Science (2001; 22 pages)).*
White et al. (Chemistry of Chlorites; Jul. 1942, pp. 782-792).*

* cited by examiner

ELECTROLYTIC METHOD OF GENERATING CHLORIDE DIOXIDE WITH IMPROVED THEORETICAL YIELD

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to methods, compositions, and apparatuses for the generation of chlorine dioxide ($ClO_2$). Chlorine dioxide is a commonly used biocide to treat various water process systems and has effectively replaced more traditional chlorine biocide. Unlike chlorine, chlorine dioxide remains a gas when dissolved in aqueous solutions and does not ionize to form weak acids. As a result, chlorine dioxide is effective over a wide pH range, and is a logical choice for water process systems that operate at alkaline pH or that have poor pH control. Moreover, chlorine dioxide is a highly effective microbiocide at concentrations as low as 0.1 parts per million (ppm) over a wide pH range.

The biocidal activity of chlorine dioxide is believed to be due to its ability to penetrate microbial cell walls and react with essential amino acids within the cell cytoplasm to disrupt cell metabolism. This mechanism is more efficient than other oxidizers that only "burn" on contact with the cell wall surfaces and is therefore more effective against legionella, algae and amoebae cysts, giardia cysts, coliforms, salmonella, shigella, and cryptosporidium.

Unfortunately, chlorine dioxide in solution is unstable with an extremely short shelf life and thus, is difficult to transport or store. Also various laws limit or prevent the transportation of chlorine dioxide. As a result, chlorine dioxide must typically be generated at its point of use.

It is known to produce chlorine dioxide electrolytically by the electro-oxidation of chlorite ions. U.S. Pat. No. 2,163,793 describes an electrochemical chlorine dioxide generating process in which an aqueous solution of alkali metal chlorite and alkali metal chloride is electrolyzed in an electrolytic cell equipped with a porous diaphragm separating the anode and the cathode compartments.

British Patent No. 714,828 describes a process for the production of chlorine dioxide by electrolyzing an aqueous solution containing chlorite and a water-soluble salt of an inorganic oxy-acid other than sulfuric acid. U.S. Pat. No. 2,717,237 discloses a method for producing chlorine dioxide by electrolysis of chlorite in the presence of a water-soluble alkali metal sulfate (e.g., sodium sulfate). Japanese Patent Publication 81-158883, published Dec. 7, 1981, describes an electrolytic process for producing chlorine dioxide by electrolysis of chlorite in which the electrolyzed solution, at a pH of 2 or less, is fed to a stripping tank where air is introduced to recover the chlorine dioxide.

U.S. Pat. No. 4,542,008 describes an electrolytic process for chlorine dioxide production in which the sodium chlorite concentration of the solution leaving the anode compartment is measured by means of a photometric cell.

PCT Published International Patent Application WO 94/26670 discloses a method of producing chlorine dioxide from sodium chlorite in which the gaseous product along with the water vapor is removed from the electrolyzed solution by means of a microporous, hydrophobic gas membrane. By removing water at the rate of its input to the anolyte, a continuous, environmentally innocuous operation with no undesired effluent can be effected.

Another method of producing chlorous acid is through the use of ion-exchange resin beds. Ion exchange is the reversible interchange of ions between a solid (ion exchange material) and a liquid in which there is no permanent change in the structure of the solid. By contacting a resin with an excess of electrolyte, the resin can be converted entirely into a desired salt form. The ion exchange process involves diffusion through a film of solution that is in close contact with the resins and diffusion within the resin particle. The manufacture of ion exchange resins can involve the preparation of a cross-linked bead copolymer either as cation exchanging resins, or as anion exchanging resins. Cation exchange resins are constructed and arranged to retain cations present within the liquid.

Published PCT International Patent Application WO 91/09158 and the corresponding U.S. Pat. No. 5,106,465 disclose a method of producing chlorine dioxide from alkali metal chlorite in an ion exchange compartment of a multi-compartment cell in which hydrogen ions generated in the anode compartment enter the ion exchange compartment through a cation exchange membrane, causing chlorite ion decomposition and forming chlorine dioxide.

In each of these methods however, either an expensive catalyst is required for optimal chlorine generation or the reagents are incompatible and present a dangerous or hazardous condition if inadvertently mixed during operation. As a result, there remains need for improved methods, compositions, and apparatuses for the generation of chlorine dioxide.

The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

At least one embodiment of the invention is directed to a method of generating chlorine dioxide. The method includes the steps of providing an apparatus, feeding at least two kinds of chlorite salt into the apparatus, feeding water into the apparatus, feeding a current into the apparatus, and evolving chlorine dioxide from the apparatus according to a reaction having a 100% theoretical yield, and in the absence of a catalyst. Some of the chlorine in the chlorite salt is converted into hydrochloric acid. The apparatus comprises: three chambers they being a first, second, and third chamber. The second chamber is in fluidic communication with the first and third chambers. A first water permeable membrane is located between at least a portion of the second and first chamber, and a second water permeable membrane is located between at least a portion of the second and third chambers. Each chamber is filled with cation exchange resin material. An anode is in the first chamber constructed and arranged to receive the current, and a cathode is in the second chamber constructed and arranged to receive the current.

The chlorite may be a sodium salt. The chlorite may comprise a combination of sodium chlorite and sodium hypochlorite. The ratio of sodium chlorite and sodium hypochlorite may be from 1:2 to 2:1. At least one of the chlorite salts may be buffered in caustic prior to its entry into the apparatus. The chlorite bearing solution may be fed into the second chamber and water may be fed into the first and the third chambers. The produced chlorine dioxide may be added to a water system as a disinfectant. Elemental chlorine may also be added to the water system. The addition may be according to an interactive disinfection regimen. The system may be one within which the chlorine dioxide is highly likely to be gassed off. The elemental chlorine may increase the amount of chlorine dioxide according to the recycle effect. The chlorine dioxide may be added at night and/or the elemental chlorine may be added during the day.

Additional features and advantages are described herein, and will be apparent from, the following Detailed Description.

BRIEF DESCRIPTION OF THE DRAWINGS

A detailed description of the invention is hereafter described with specific reference being made to the drawings in which.

DETAILED DESCRIPTION OF THE INVENTION

Figure 1:
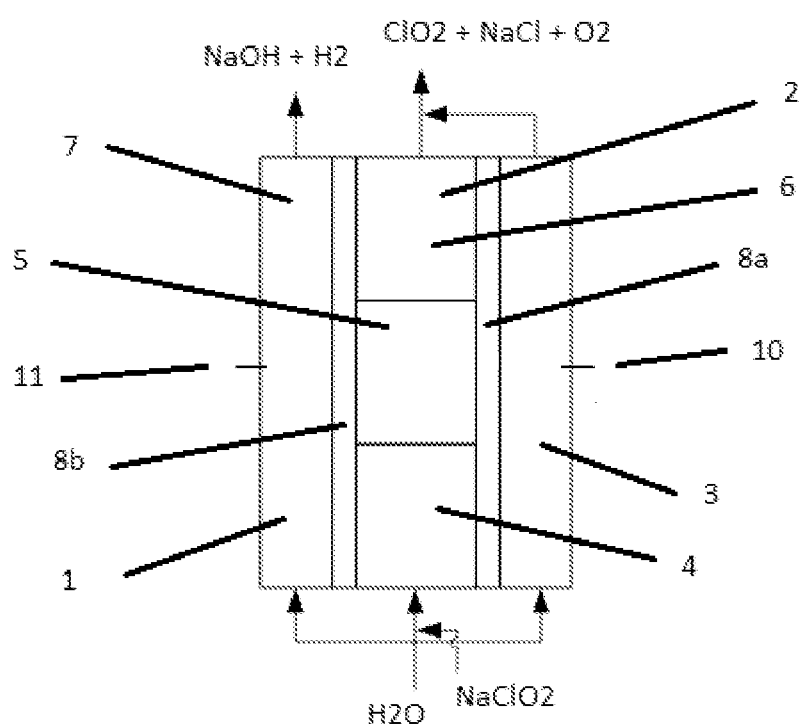
FIG. 1 is a side view diagram of a 3-region cassette.

The following definitions are provided to determine how terms used in this application, and in particular how the claims, are to be construed. The organization of the definitions is for convenience only and is not intended to limit any of the definitions to any particular category.

"Actual Yield" means the stoichiometric amount of chlorine dioxide recovered from the system.

"Cassette" means an apparatus comprising at least two chambers in at least partial fluidic communication to each other, through which at least two reagents at least partially pass and are converted into at least one desired product. A cassette can be a modular apparatus containing all of the components necessary to accomplish a particular chemical reaction.

"Catalyst" means a substance that alters the speed of, or makes possible, a chemical or biochemical reaction but remains unchanged at the end of the reaction. Catalysts include but are not limited to enzymes, transition metals, or transition metal bearing compounds. Catalysts operate according to a number of principles including but not limited to increasing rate of particle collisions, limiting the direction of particle collisions, or lowering the energy required for a successful particle collision. In this application, Catalysts may be referred to with the notation "C—Pt".

"Cation Exchange Membrane" means a membrane which facilitates an ion exchange process by allowing the passage of cations while preventing the passage of anions.

"Cation Exchange Resin" means a resin containing negatively charged radicals that can attract and hold cations in place allowing the anions of a molecule free to migrate away from the entrapped cations of that molecule. The resin may be in part or entirely: insoluble, organic, and/or polymeric. In this application, Cation Exchange Resins may be referred to with the notation "R–".

"Efficiency Yield" means the relationship between Actual Yield and Efficiency Yield as expressed in the equation:

EY=(Actual Yield/Theoretical Yield)×100.

"Theoretical Yield" means the maximum possible amount of chlorine dioxide that can be recovered from the system based on the constraints of the chemical reactions involved.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

Referring now to FIG. 1 there is shown at least one embodiment of a cassette (7) used to generate chlorine dioxide. The cassette can be one of the apparatuses disclosed in U.S. Pat. No. 6,869,517 with the same or different feed procedures. The cassette comprises three chambers (1, 2, and 3). The first chamber (1) and the third chamber (3) are at least partially filled with at least one cation exchange resin. One of the first (1) or third (3) chambers may contain at least one cathode (11). One of the first (1) or third (3) chambers may contain at least one anode (10). In fluidic communication with the first and third chambers (1, 3) is a second chamber (2). The second chamber comprises three regions (4, 5, 6). An upstream region (4) contains a mass of at least one cation exchange resin. A downstream region (6) contains at least one catalyst material. An inner region (5) positions upstream of the downstream region (6) and downstream of the upstream region (4) contains a mixture of at least one catalyst material and at least one cation exchange resin. Fluid permeable cation exchange membranes (8a, 8b) are positioned between and in fluidic communication with both at least part of the second chamber (2) and at least part of the first and/or third chambers (1, 3).

In at least one embodiment at least one oxidant, and or at least one chlorite, and or water are passed into one or more of the first, second, and third chambers. In at least one embodiment the water is passed into the second chamber and the chlorite and oxidant (in or out of solution) are passed into one or both of the first or third chamber.

Through an ion-exchange reaction facilitated by select migration of materials through the chambers, a product comprising chlorine dioxide emerges from the second chamber. In at least one embodiment the oxidant is chlorine. In at least one embodiment the catalyst is platinum. In at least one embodiment AC or DC current is run through one or both of the anode and/or cathode. In at least one embodiment if one of the first or third chamber has an anode, the other of the first or third chamber has a cathode. In at least one embodiment the ratio of catalyst to cation exchange resin by mass is between 2:1 to 1:2 and is preferably 1:1.

In at least one embodiment the chlorite is sodium chlorite ($NaClO_2$). In at least one embodiment the ion exchange reaction operates according to the equation:

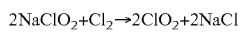

$2NaClO_2+Cl_2 \rightarrow 2ClO_2+2NaCl$

In at least one embodiment a stoichiometric excess of oxidant relative to chlorite is added. The excess is useful because not all of the chlorite may become reacted and excessive residual chlorite might contaminate the system being treated by the biocide. In at least one embodiment (and in particular in cases where the water being treated is potable and/or when the oxidant is chlorine) the stoichiometric excess is slight and is not sufficient to allow the formation of trihalomethanes out of the excess oxidant.

In at least one embodiment the chlorite is a combination of sodium chlorite ($NaClO_2$) and sodium hypochlorite (NaOCl) and the oxidant is an acid. In at least one embodiment the ion exchange reaction operates according to the equation:

$$2NaClO_2 + NaOCl + 2HCl \rightarrow 2ClO_2 + 3NaCl + H_2O$$

In at least one embodiment sufficient acid is used to obtain a pH of between 2 and 3.

While a 3 reagent reaction is effective, it runs the risk of an inadvertent combination of two of the reagents in the absence of the third which can lead to unwanted consequences. For example HCl combined with either of $NaClO_2$ alone or NaOCl alone can cause fire or an explosion. As a result a two reagent reaction is preferable.

In at least one embodiment the chlorite is sodium chlorite ($NaClO_2$) and the oxidant is an acid. In at least one embodiment the ion exchange reaction operates according to the equation:

$$5NaClO_2 + 4HCl \rightarrow 4ClO_2 + 5NaCl + 2H_2O$$

This combination of sodium chlorite and an acid oxidant has the benefit of only requiring two reagents. Unfortunately it tends to only have an 80% efficiency yield and the acid may be corrosive to the system being treated.

In at least one embodiment the catalyst comprises a plurality of low density structures bored with a large number of tunnels facilitating a large surface area with a catalytic material covering at least a portion of the surface area. In at least one embodiment the low density structure is at least partially ceramic. In at least one embodiment the catalytic material comprises platinum. In at least one embodiment the catalytic material is a coating solution comprising tetraammineplatinum (II) chloride crystal, isopropyl alcohol, and ammonia hydroxide and water.

3-Region Mechanism:

In at least one embodiment the ion exchange reaction operates according to the following mechanism: In the central chamber (2) sodium ions from the sodium chlorite are taken by the resin R– and are exchanged with hydrogen ions converting the sodium chlorite into chlorous acid according to the equation:

$$NaClO_2 + R{-}H \rightarrow HClO_2 + R{-}Na$$

The chlorous acid is then converted into chlorine dioxide with the aid of the catalyst.

$$5HClO_2 + C\text{-}Pt \rightarrow 4ClO_2 + HCl + 2H_2O + C{-}Pt$$

A current applied to the anode oxidizes water to produce $H^+$ ions and oxygen gas.

$$2H_2O \rightarrow O_2 + 4H^+ + 4e^-$$

The $H^+$ ions migrate into the second chamber and displace Na+ ions on the cation resin.

$$H^+ + R{-}Na \rightarrow Na^+ + R{-}H$$

The $Na^+$ ions migrate towards the cathode bearing chamber where water is reduced to produce hydroxide ions and hydrogen gas.

$$2H_2O + 2e^- \rightarrow H_2 + 2OH^-$$

The sodium ions combine with the hydroxide ions to form sodium hydroxide. The overall reaction is:

$$5NaClO_2 + 4H_2O \rightarrow [4ClO_2 + NaCl + O_2]_{product} + [4NaOH + 2H_2]_{reject}$$

This overall reaction displays a maximum theoretical yield of 80% based on $NaClO_2$ consumed as a result its efficiency in producing $ClO_2$.

Figure 2:
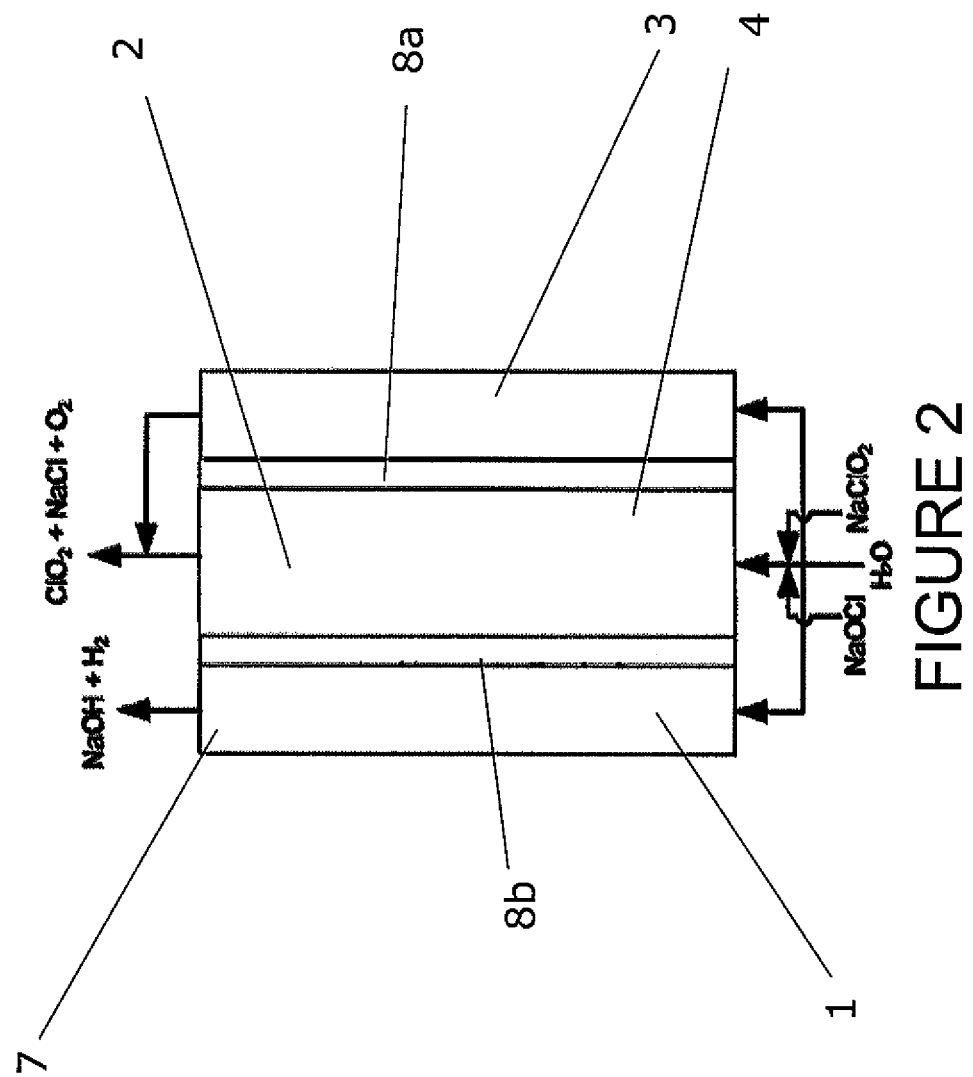
FIG. 2 is a side view diagram of a 1-region cassette.

1-Region Mechanism:

In at least one embodiment the ion exchange reaction is performed within the cassette illustrated in FIG. 2. Unless otherwise stated, the reference numbers in FIG. 2 refer to the same items as they do in FIG. 1. The ion exchange reaction operates according to the following mechanism: In the central chamber (2) two forms of chlorite are introduced, sodium chlorite and sodium hypochlorite where they interact with the resin to form chlorous acid and hypochlorous acid.

$$NaClO_2 + R{-}H \rightarrow HClO_2 + R{-}Na$$

$$NaOCl + R{-}H \rightarrow HOCl + R{-}Na$$

The chlorous acid is converted into chlorine dioxide without the presence of a catalyst.

$$2HClO_2 + HOCl \rightarrow 2ClO_2 + H_2O + HCl$$

A current applied to the anode within the anode bearing chamber oxidizes water to produce $H^+$ ions and oxygen gas.

$$2H_2O \rightarrow O_2 + 4H^+ + 4e^-$$

The $H^+$ ions migrate into the center chamber (2) and displace sodium ions on the cation resin.

$$H^+ + R{-}Na \rightarrow Na^+ + R{-}H$$

The sodium ions migrate into the cathode bearing chamber and where water is reduced to produce hydroxide ions and hydrogen gas.

$$2H_2O + 2e^- \rightarrow H_2 + 2OH^-$$

The sodium ions combine with the hydroxide ions to produce sodium hydroxide. The overall reaction is:

$$2NaClO_2 + 2NaOCl + 4H_2O \rightarrow [2ClO_2 + HCl + O_2]_{product} + [3NaOH + 2H_2]_{reject}$$

This reaction has a theoretical yield of 100% based on $NaClO_2$ consumed and therefore is potentially highly efficient.

In at least one embodiment, at first both sodium chlorite and sodium hypochlorite are introduced but then the flow of sodium chlorite is turned off and only sodium hypochlorite continues to be introduced. This results in cassette contents being converted into elemental chlorine ($Cl_2$). In at least one embodiment the flow of sodium chlorite and sodium hypochlorite into the cassette are controlled by pumps governed by control logic and the control logic increases or decreases the flow of sodium chlorite and sodium hypochlorite to appropriately facilitate the output to be chlorine dioxide, elemental chlorine, or a mixture of the two.

In at least one embodiment the cassette is constructed and arranged to output according to an interactive disinfection regimen. In such a regimen, the cassette outputs more than one disinfectant (for example chlorine and elemental chlorine) at the same or at different times. Outputting more than one kind of disinfectant can be more effective because of sequential effects and/or synergistic effects. In a sequential effect, at least some of the different disinfectants are output at different times and denies the targeted organisms an opportunity to adapt or develop a resistance to a static disinfectant regimen. In a synergistic effect, the two (or more) disinfectants are more potent as disinfectants when introduced simultaneously or sequentially that they are when applied in the absence of other disinfectant(s). The synergistic effect may be attributed by rate at which two different disinfectants simultaneously attack a cell by two different mechanisms versus that rate of each of them alone.

Interactive disinfection regimens are particularly effective when dealing with particular organisms or particular combinations of organisms. Also some disinfectants are better at largely reducing a thriving population while others are more effective at suppressing residual activity of an already mostly disinfected population. For example, typically chlorine dioxide is sometimes less effective than chlorine at disinfecting certain infestations, but chlorine has been found to be ineffective in reducing Legionella bacteria, certain protozoans and biofilms, which contribute to the establishment and dissemination of these bacteria in water systems, and their resistance to treatments. Chlorine dioxide however was found to be more effective when suppressing residual activity of these organisms after previous disinfection regimens.

Other benefits of using interactive disinfection regimens are that chlorine is less expensive than chlorine dioxide so cost optimization can be factored into the choice and proportion of disinfectants used. In addition difficulties in disposal of the disinfectants can also be used to determine optimal choices. Chlorine dioxide is a dissolved gas and can be easily disposed of by gassing it off while elemental chlorine is ionized and is harder to dispose of. Chlorine dioxide can be degraded by sunlight but not chlorine.

In at least one embodiment, the regimen involves at first utilizing significant amounts of elemental chlorine to overcome the initial infestation but then utilizing less effective but cheaper and easier to use chlorine dioxide to facilitate the suppression of any residual infestation in a cost effective manner.

In at least one embodiment in an environment where a gaseous disinfectant is highly likely to gas off some or a large amount of chlorine dioxide, elemental chlorine is added to remain in solution. Such environments include but are not limited to cooling towers, whirl pools, fountains, and other applications where water is sprayed or agitated and chlorine dioxide may gas off. Adding elemental chlorine, which will remain in solution, can be added with intermittent doses of chlorine dioxide for a cost effective method of disinfection. In at least one embodiment chlorine dioxide is also added at nights to avoid photodegradation, while elemental chlorine is added during the daytime.

In at least one embodiment the recycle effect can be utilized. When chlorine dioxide kills a cell, at least some of it reduces to chlorite ion. In the presence of chorine, chlorite ion can be oxidized by chlorine to form chlorine dioxide. Thus adding elemental chlorine can be used to supplement the amount of chlorine dioxide available.

EXAMPLES

The foregoing may be better understood by reference to the following examples, which are presented for purposes of illustration and are not intended to limit the scope of the invention.

Example 1

A three chambered 3-Region cassette was prepared having a second chamber containing an ion exchange cation resin region, a 50/50 resin catalyst region, and a catalyst region. Membranes were placed between the second chamber and the first and third chambers. Softened water was passed through the anode and second chamber at a flow rate of ~150 ml/min. A 25 wt % of sodium chlorite solution was added to the stream causing the final concentration to reach 1000 mg/ml. The effluent form the anode and second chamber were combined. Softened water was passed by the cathode at a flow rate of 20 ml/min. A current of 3 A was applied to the anode and cathode and was based on a 90% current efficiency.

Because of the constraints of the chemical reactions in the 3-Region on chamber process the theoretical yield was limited to ⅘ of the chlorite added to the system.

Example 2

A 1-Region 3 chambered cassette was prepared having a second chamber containing an ion exchange cation resin region and no catalyst. The cassette had an anode and cathode and membranes as well. Softened water was passed through the anode and second chamber at a flow rate of ~150 ml/min. A 25 wt of sodium chlorite solution was added to the stream causing the final concentration to reach 976 mg/ml. A 6.25% sodium hypochlorite solution was also added such that the final concentration of sodium hypochlorite was ~554 mg/ml. This resulted in a 1:1 molar correspondence between sodium chlorite and sodium hypochlorite. Softened water was passed by the cathode at a flow rate of 20 ml/min. A current of 6 A was applied to the anode and cathode and was based on a 90% current efficiency. The theoretical yield for this reaction was 100%.

The results of examples 1 and 2 are displayed on table 1.

TABLE 1

| Cassette Type | 3-Region | 1-Region |
|---|---|---|
| Voltage (V) | 19.5 | 25.9 |
| Current (A) | 3.0 | 6.0 |
| Flow Rate (mL/min) | 154 | 152 |
| [$ClO_2$] mg/L | 533 | 663 |
| Temp ° C. | 10.1 | 10.0 |
| Actual Yield g/h | 4.9 | 6.0 |
| % Yield | 92.8 | 91.1 |

The data demonstrates that a two precursor electrolytic method of generating chlorine dioxide results in a 20% greater yield than the three region process. This efficiency results in cost savings is in addition to avoiding the need for expensive catalyst and lends itself to easier manufacturing as all three chambers can contain the same resin. The complexities inherent in using multiple precursors can be mitigated by buffering them in caustic and utilizing precursors that do not unduly react with each other.

While this invention may be embodied in many different forms, there are shown in the drawings and described in detail herein specific preferred embodiments of the invention. The present disclosure is an exemplification of the background and principles of the invention and is not intended to limit the invention to the particular embodiments illustrated. All patents, patent applications, scientific papers, and any other referenced materials mentioned anywhere herein, are incorporated by reference in their entirety. Furthermore, the invention encompasses any possible combination of some or all of the various embodiments described herein and incorporated herein as well as combinations which exclude one, some, or all but one of the various embodiments described herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of generating a disinfectant, the method comprising:
    feeding sodium chlorite and sodium hypochlorite into a central chamber of an apparatus, the apparatus comprising:
        three chambers consisting of a first chamber, a second chamber, and a third chamber, the second chamber being the central chamber positioned between the first and third chambers and in fluid communication with the first and third chambers through water-permeable membranes, and each of the three chambers being filled with cation exchange resin; and
        an anode disposed in the first chamber and a cathode disposed in the third chamber in electrical communication with the anode,
    feeding water into at least one of the chambers of the apparatus, and
    feeding a current into the apparatus to produce an output of chlorine dioxide from the central chamber, and
    periodically decreasing or turning off a flow of the sodium chlorite into the apparatus to produce an output of elemental chlorine or a combination of elemental chlorine and chlorine dioxide in the absence of a catalyst,
    wherein the chlorine dioxide is produced by a reaction where only water reacts at the anode and cathode, and the sodium chlorite and sodium hypochlorite are converted first into chlorous acid and hypochlorous acid and then into chlorine dioxide in the central chamber and the reaction takes place without the addition of an inorganic acid.

2. The method of claim 1 wherein when sodium chlorite and sodium hypochlorite are both fed, the sodium chlorite and sodium hypochlorite are fed at a ratio of 2:1.

3. The method of claim 1 further comprising buffering at least one of the chlorite salts in caustic prior to its entry into the apparatus.

4. The method of claim 1 further comprising sequentially adding the output of chlorine dioxide and the output of elemental chlorine or combination of elemental chlorine and chlorine dioxide into an aqueous stream for disinfecting.

5. The method of claim 4 in which the chlorine dioxide and elemental chlorine are added according to an interactive disinfection regimen.

6. The method of claim 5 in which the chlorine dioxide is added to a system which is subject to spray or agitation.

7. The method of claim 5 in which the elemental chlorine increases the amount of chlorine dioxide according to a recycle effect.

8. The method of claim 5 in which the chlorine dioxide is added at night and the elemental chlorine is added during the day.

9. The method of claim 1 comprising periodically turning off the flow of sodium chlorite.

10. The method of claim 1 further comprising increasing or turning on the flow of sodium chlorite after a period of time of having been decreased or turned off.

11. The method of claim 1 further comprising controlling the turning off and thereafter turning on of the flow of sodium chlorite into the apparatus to alternate production of elemental chlorine or chlorine dioxide.

12. The method of claim 1 further comprising controlling the decreasing and thereafter increasing the flow of sodium chlorite into the apparatus to increase and decrease production of elemental chlorine.

13. The method of claim 12, wherein the controlling is done by controlling pumps governed by control logic.

14. The method of claim 1, wherein the chlorine dioxide is produced by a reaction where:
    the anode oxidizes water to produce $H^+$ ions and oxygen gas, H+ ions migrate into the central chamber;
    sodium chlorite and sodium hypochlorite exchange sodium ions for $H^+$ ions at the cation exchange resin in the central chamber to produce chlorous acid and hypochlorous acid;
    the cathode reduces water to produce hydroxide ions and hydrogen gas;
    sodium ions migrate into the chamber comprising the cathode and combine with the hydroxide ions to produce sodium hydroxide; and
    the chlorous acid and hypochlorous acid are converted into chlorine dioxide, water, and hydrochloric acid.

* * * * *

UNITED STATES PATENT AND TRADEMARK OFFICE
CERTIFICATE OF CORRECTION

PATENT NO. : 10,046,990 B2
APPLICATION NO. : 13/153656
DATED : August 14, 2018
INVENTOR(S) : DiMascio Page 1 of 1

It is certified that error appears in the above-identified patent and that said Letters Patent is hereby corrected as shown below:

On the Title Page

Item (57) Abstract: "yield which is s significant improvement" should read --yield which is a significant improvement--

Signed and Sealed this
Nineteenth Day of May, 2020

Andrei Iancu
*Director of the United States Patent and Trademark Office*